United States Patent [19]

Gibson

[11] 4,074,308
[45] Feb. 14, 1978

[54] DELAY LINE NETWORK FOR PROCESSING A COMPOSITE ELECTRICAL SIGNAL

[75] Inventor: Walter Gold Gibson, Princeton, N.J.

[73] Assignee: RCA Corporation, New York, N.Y.

[21] Appl. No.: 736,420

[22] Filed: Oct. 28, 1976

[51] Int. Cl.² .................. H04N 9/00; H04N 5/14
[52] U.S. Cl. .................... 358/38; 333/70 T; 358/166
[58] Field of Search .............. 358/38, 39, 162, 166, 358/904, 160, 188; 333/29, 70 T

[56] References Cited

U.S. PATENT DOCUMENTS

| | | | |
|---|---|---|---|
| 3,919,714 | 11/1975 | Bingham | 358/38 |
| 3,938,181 | 2/1976 | Avins | 358/38 |
| 3,983,576 | 9/1976 | Shanley et al. | 358/38 |
| 3,984,865 | 10/1976 | Avins | 358/39 |

*Primary Examiner*—Robert L. Richardson
*Attorney, Agent, or Firm*—Eugene M. Whitacre; Ronald H. Kurdyla

[57] ABSTRACT

A wideband signal delay line network comprises at least respective end terminals and an intermediate terminal. One of the end terminals and the intermediate terminal are coupled to a source of wide bandwidth composite signal, and are arranged to provide a signal time delay therebetween substantially equal to NT/2, where N is an odd integer and T is the reciprocal of a selected frequency at which it is desired to provide a desired amplitude response (e.g., attenuation or null) of the composite signal. A combined signal appearing at the intermediate terminal is representative of the composite signal coupled to the intermediate terminal and the composite signal coupled to the one end terminal, the latter signal being delayed relative to the composite signal coupled to the intermediate terminal. The combined signal is coupled via the remaining end terminal to utilization means. An illustrative utilization means comprises an amplitude peaking circuit accepting signals from the remaining end terminal and additional intermediate terminals of the delay line network.

18 Claims, 15 Drawing Figures

DELAY LINE NETWORK FOR PROCESSING A COMPOSITE ELECTRICAL SIGNAL

The present invention relates to apparatus for establishing a desired amplitude versus frequency transfer characteristic of a composite electrical signal and, more particularly, to transversal equalizer apparatus for processing a television video signal to provide mutually independent control of the amplitude response of preselected video signal frequency components.

Color television video signals contain luminance, chrominance and sound signal portions. The luminance signal portion has a relatively wide bandwidth and extends into a lower frequency range and a higher frequency range. The higher frequency range has a relatively narrow bandwidth and includes chrominance and sound signal portions. The detail information of an image to be reproduced is contained in the high frequency components of the luminance signal portions. To process these signals, color television receivers include a chrominance channel for processing the chrominance signal portions and a luminance channel for processing the luminance signal portions.

In order to improve the sharpness and fine detail resolution of the image, it is desirable to improve the transient response of the luminance channel by increasing the high frequency response of the luminance channel. However, since the presence of chrominance and/or sound signal portions in the luminance channel tends to result in the generation of undesirable visible patterns in the image, it is also desirable to provide means to remove chrominance and sound signal portions from the luminance channel. A band elimination filter or trap circuit centered around a color subcarrier frequency to remove chrominance signal portions, a trap circuit centered around an intercarrier sound frequency to remove sound signal portions, and a peaking circuit to relatively accentuate high frequency components of the luminance signal portions have been separately provided in the luminance channel.

It is known that the response of video signal processing systems may be subjectively improved by increasing the steepness of amplitude transitions in the video signals, and that the response may also be improved by the generation of a preshoot just before a transition and an overshoot just after the transition. It is also known that a desired amplitude or phase characteristic (or both) as a function of frequency may be formed substantially without introducing phase non-linearity or phase distortion by means of an apparatus wherein delayed signals generated at terminals (usually referred to as taps) along a delay line or like device are combined in a predetermined manner. Such apparatus, sometimes called a "transversal equalizer" or "transversal filter," is generally described in U.S. Pat. No. 2,263,376 (A. D. Blumlein et al.).

Transversal equalizers are useful in a variety of applications in the signal processing field. For instance, such apparatus may be found useful in horizontal and vertical aperture beam correction, as is described in U.S. Pat. No. 2,759,044 (B. M. Oliver). Transversal equalizers are also useful in television signal processing arrangements for accentuating the amplitudes of relatively high frequency components of luminance signal portions of a video signal while attenuating the amplitudes of chrominance or sound portions of the video signal or both. Examples of such arrangements are described in copending U.S. patent application Ser. No. 553,642, and now U.S. Pat. No. 4,041,531, entitled "Television Signal Processing Apparatus Including A Transversal Equalizer," of Joseph P. Bingham, filed Feb. 27, 1975 (continuation-in-part of abandoned application Ser. No. 486,241, filed July 5, 1974); U.S. Pat. Nos. 3,983,576 (R. L. Shanley, II et al.); 3,984,865 (J. Avins); 3,919,714 (J. P. Bingham) and 3,938,181 (J. Avins), all assigned to the same assignee as the present invention.

In addition, U.S. Pat. No. 2,922,965 (C. W. Harrison) describes transversal equalizer apparatus wherein a reflective termination is coupled to a delay line having a plurality of taps to reduce the number of taps required. In another application of a delay line described in U.S. Pat. No. 3,749,824 (Sagashima et al.), a reflective termination is selectively coupled to one end of a luminance channel delay line during color transmission to suppress chrominance signal portions. The delay line also serves to compensate for the time delays of signals processed in the luminance and chrominance channels.

In a television receiver or similar system for processing a composite signal to provide a predetermined signal transfer characteristic, such as attenuation and accentuation of selected frequencies, it is advantageous to employ a single circuit for this purpose in order to reduce complexity and cost. More specifically, it is desirable in a luminance channel of a color television receiver to employ a single circuit which is readily adaptable to control (e.g., relatively accentuate or peak) high frequency portions of the luminance signal component of the video signal, and which also relatively attenuates or nulls chrominance or sound signal components substantially independent of the signal accentuating function.

Furthermore, it is often desirable to provide for adjustment of the peaking characteristic of the luminance channel. For example, it may be desirable to controllably accentuate the amplitude of certain relatively high frequency portions of the luminance signals depending on the quality of the received television signal. In this regard, it is desirable for the signal accentuating and attenuating functions to be mutually independent so that adjustment of the amplitude of the relatively high frequency components does not substantially affect the attenuation or trapping characteristics of the luminance channel.

Apparatus in accordance with the present invention comprises a source of wide bandwidth composite signal and a wide bandwidth signal delaying network having at least respective end terminals and an intermediate terminal. The source of composite signal is coupled to one of the end terminals and to the intermediate terminal. The one end terminal and the intermediate terminal are arranged to provide a signal time delay therebetween substantially equal to NT/2, where N is an odd integer and T is the reciprocal of a selected frequency at which it is desired to provide a predetermined amplitude response of the composite signal. A combined signal appearing at the intermediate terminal is representative of relatively delayed and undelayed composite signals. The combined signal exhibits the desired amplitude response at the selected frequency. A signal utilization network is coupled to the remaining one of the end terminals for tailoring the amplitude versus frequency response of the combined signal.

In accordance with a feature of the invention, the signal delaying network further comprises a plurality of terminals or taps for developing delayed signals from the combined signal. At least one of the delayed signals is utilized to derive a relatively broadband signal. Two other of the delayed signals having an average time delay approximately equal to the time delay of the one delayed signal are combined with broadband signal to derive a narrowband signal. Means are also included for controlling the amplitude response of the narrowband signal to produce a controlled amplitude narrowband signal, which is then combined with the broadband signal to produce an amplitude controlled output signal. The output signal exhibits an attenuated or substantially zero amplitude response at the selected frequency independent of adjustment of the control means.

In the following description, similar components appearing in different figures may be formed in the same manner.

Figure 1:
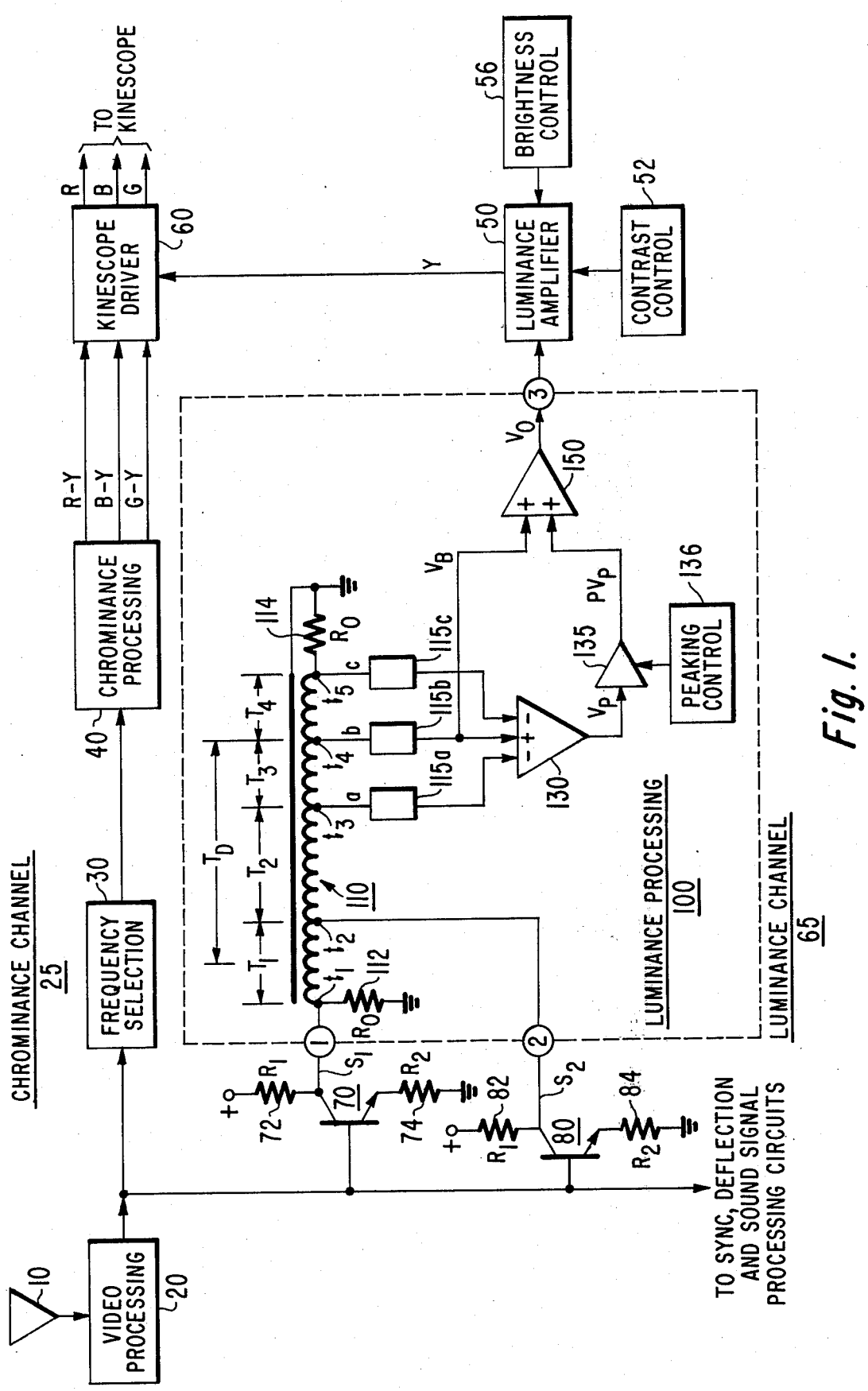
FIG. 1 shows, partially in block diagram form and partially in schematic circuit diagram form, a general arrangement of a color television receiver employing an apparatus constructed in accordance with the present invention.

Referring now to FIG. 1, a general arrangement of a color television receiver employing the present invention includes a video signal processing unit 20 responsive to radio frequency (RF) television signals received by an antenna 10, for generating, by means of suitable intermediate frequency circuits and detection circuits (not shown), a composite video signal comprising chrominance, luminance, sound and synchronizing signals. The output of video signal processing unit 20 is coupled to a chrominance channel 25, to a luminance channel 65, and to sync, deflection and sound signal processing circuits (not shown).

Chrominance channel 25 includes a frequency selection unit 30 for selectively coupling the chrominance portion of the video signal to a chrominance processing unit 40. Chrominance processing unit 40 serves to derive R-Y, B-Y and G-Y color difference signals from the chrominance portion of the composite video signal.

A luminance signal processing unit 100 of luminance channel 65 serves to attenuate undesirable signals present in luminance channel 65 such as chrominance or sound signals, while accentuating or peaking the amplitudes of relatively high frequency components of the luminance signals to improve the transient response and fine detail resolution of reproduced images. The video signal is coupled to input terminals 1 and 2 of luminance processor 100 via a pair of high impedance signal current sources represented by similarly arranged transistors 70 and 80. Luminance signal processing unit 100 may also serve to equalize the time delays of the signals processed in chrominance channel 25 and luminance channel 65.

The output of luminance signal processing unit 100 is coupled via a terminal 3 to a luminance amplifier 50 which serves to amplify and otherwise process the output signals of luminance signal processing unit 100 to produce an output signal Y of luminance channel 65. The Y output signal of luminance channel 65 and the R-Y, G-Y and B-Y color difference output signals of chrominance channel 25 are coupled to a kinescope driver 60 where they are matrixed to form R, G and B color signals. The R, G and B color signals drive a kinescope (not shown). Alternatively, the luminance and color difference signals may be matrixed in the kinescope as is known.

A contrast control unit 52 is coupled to luminance amplifier 50 to control the amplitude of the luminance signals and thereby control the contrast of reproduced images. Contrast control unit 52 may also be coupled to chrominance processing unit 40 to control the amplitude of the chrominance signals and thereby control the saturation of the reproduced images. A brightness control unit 56 also is coupled to luminance amplifier 50 to control the DC content of the luminance signals and thereby control the brightness of the reproduced images.

Luminance signal processing unit 100 includes a wide bandwidth, substantially linear phase signal delaying network 110, shown as a delay line, responsive to video signals $S_1$ and $S_2$ coupled via terminals 1 and 2. A plurality of terminals or taps $t_1$, $t_2$, $t_3$, $t_4$ and $t_5$ are coupled to delay line 110 at successive points. The combination of signal delaying network 110 and taps $t_1$-$t_5$ is sometimes referred to as a tapped delay line. Video signals $S_1$ and $S_2$ are coupled to input taps $t_1$ and $t_2$, which are spaced to provide a time delay $T_1$. Taps $t_3$, $t_4$ and $t_5$ represent output taps of delay line 110 and are spaced at intervals to develop respective delayed signals a, b and c delayed in time relation to input signal $S_1$ by respective time intervals $T_1+T_2$, $T_1+T_2+T_3$, and $T_1+T_2+T_3+T_4$.

Delay line 110 also provides a time delay $T_D$ which represents an effective time delay for equalizing the time delays of the signals processed in luminance channel 65 and chrominance channel 25. Signal reflections along delay line 110 are minimized by termination resistors 112 and 114 each of a value $R_0$, corresponding to the characteristic impedance of delay line 110.

Delayed signals a, b, and c are coupled via signal amplitude weighting elements 115a, 115b and 115c to a combining circuit 130 where signals a and c are algebraically subtracted from relatively wideband signal b to form a relatively narrowband signal $V_P$. Combining circuit 130 may be formed by any suitable circuit for algebraically combining signals, such as a resistive summing matrix in combination with a differential amplifier, or an operational amplifier having inverting (−) and noninverting (+) inputs. The output $V_P$ of combining circuit 130 is coupled to a variable gain device 135 which serves to modify the amplitude of $V_P$ to form a signal $PV_P$, where P is the gain or attenuation factor of device 135, in accordance with a control signal generated by a peaking control circuit 136. As will be seen, the peaking characteristics of luminance processor 100 are primarily determined by $V_P$.

Variable gain device 135 which, for example, may be formed by a variable gain amplifier, is arranged to produce a range of gains extending from values less than unity to values greater than unity in response to the control signal developed by peaking control circuit 136. Peaking control circuit 136 may, for example, be formed of any suitable device for providing a signal in response to manual adjustment. Alternatively, peaking control circuit 136 can be arranged to derive a control signal from a portion of the composite video signal indicative of picture quality such as is described in U.S. Pat. No. 3,919,714.

The output, $PV_P$, of variable gain device 135 is coupled to a summing circuit 150 where it is algebraically added to the wideband signal $b$ ($V_B$) to form an output signal $V_O$. Summing circuit 150 may be formed by any suitable circuit for algebraically adding signals such as an operational amplifier, a resistive matrix or the like.

Figure 3:
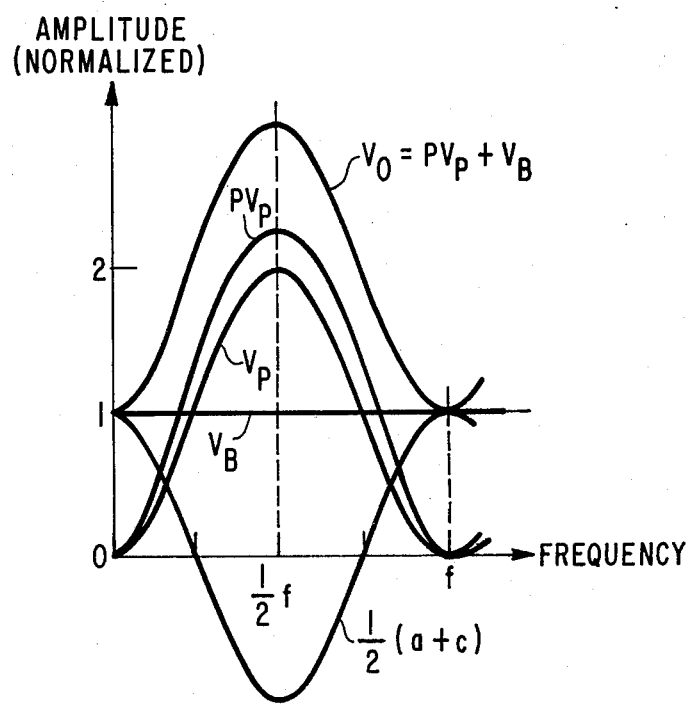
FIG. 3 is a graphical representation of frequency domain waveforms useful in understanding the operation of the apparatus of FIGS. 1 and 2.

The operation of luminance signal processing circuit 100 will be explained by way of example wherein $T_3$ and $T_4$ are selected to be equal to time delays of $1/f$, where $f$ is the frequency of a signal component of the video signal ($S_1$, $S_2$), such as a chrominance signal subcarrier which may be undesirably present in luminance channel 65. It is noted that in the absence of the video signal $S_2$ coupled from terminal 2 to intermediate input tap $t_2$ of delay line 110, delay 110 together with the circuit elements coupled to output taps $t_3$, $t_4$ and $t_5$ comprise a known transversal equalizer arrangement. The frequency domain transfer characteristic of such transversal equalizer is shown in FIG. 3, as is known. As seen from FIG. 3, a peak amplitude response of output signal $V_O$ appears at frequency $\frac{1}{2}f$ and odd integral multiples thereof, and a minimum amplitude response occurs at integral multiples of a frequency $f$. A residual amount of signal of frequency $f$ appears in the output signal $V_O$, since the signal of frequency $f$ exhibits a normalized amplitude of 1 in this case.

The frequency domain transfer characteristic described above is modified when the video signal $S_2$ is coupled to intermediate tap $t_2$ of the delay line 110, as discussed below.

The input video signals $S_1$ and $S_2$ from current source transistors 70 and 80 can be represented as currents $I_1$ and $I_2$ according to the following expression:

$$I_1, I_2 = I\cos(\omega t + \theta)$$

where ($\omega t + \theta$) represents an alternating input video signal of radian frequency $\omega$, time varying phase $\omega t$, and a nominal reference phase $\theta$. A voltage generated by input signal $I_2$ at tap $t_2$ can be represented as $V_2$ according to the expression:

$$V_2 = (IR_0/2)\cos(\omega t + \theta)$$

where $R_0$ represents the resistance value of terminating resistors 112, 114. A voltage $V_1$ developed by input signal $I_1$ at tap $t_1$, with respect to the voltage $V_2$ at tap $t_2$, can be represented by the expression:

$$V_1 = (IR_0/2)\cos(\omega t + \theta - \omega T_1)$$

where $\omega T_1$ represents phase variations as a function of radian frequency, and $T_1$ represents a signal delay time developed by the portion of delay line 110 between taps $t_1$ and $t_2$. Thus the signal $V_1$ is delayed by an amount $T_1$ with reference to the signal $V_2$ at tap $t_2$.

A combined signal $V_1 + V_2$ appearing at tap $t_2$ is defined by the expression:

$$V_1 + V_2 = IR_0\cos(\frac{\omega T_1}{2})\cos(\omega t + \theta - \frac{\omega T_1}{2}).$$

Figure 4A:
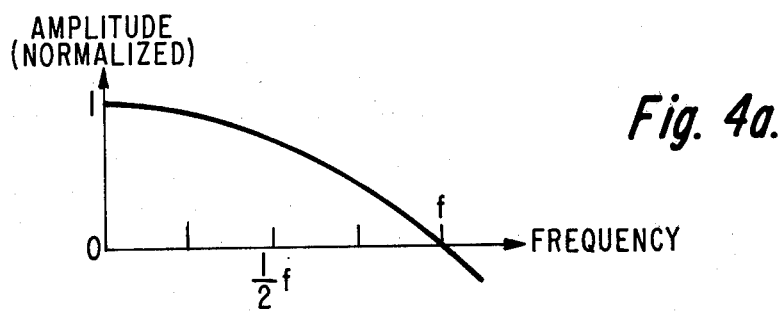
FIGS. 4a-4f are further graphical representations of frequency domain waveforms useful in understanding the operation of the apparatus of FIGS. 1 and 2.

The amplitude versus frequency response characteristic of the combined input video signal $V_1 + V_2$ appearing at tap $t_2$ is shown in FIG. 4a.

Time delay $T_1$ is defined by the expression $NT/2$ where N is an odd integer and T is the reciprocal of a selected frequency at which it is desired to attenuate or null the selected frequency, for example. In the examples to be described, N was chosen as 1. Other values of N may be useful in other particular applications.

As can be seen from FIG. 4a, the combined video signal $V_1 + V_2$ corresponds to a cosine function and exhibits an attenuated frequency versus amplitude response with a null at frequency $f$ when N equals 1. The null frequency $f$ is determined by time delay $T_1$, and the amount of attenuation is related to the amplitudes of the video signals coupled to taps $t_1$ and $t_2$. For example, assuming negligible signal loss between taps $t_1$ and $t_2$, when it is desired to null the video signal at frequency $f$, the amplitudes of the video signals coupled to taps $t_1$ and $t_2$ are chosen to be substantially equal, and the time delay $T_1$ is selected to be equal to one-half of the reciprocal of the frequency $f$. Thus, the amplitude versus frequency transfer characteristic of the combined input video signal appearing at tap $t_2$ can be readily tailored to suit a particular circuit application by adjusting the time delay $T_1$ or the relative amplitudes of the input video signals applied to taps $t_1$ or $t_2$, or both. As a further example, when N = 3, the transfer characteristic of the combined signal appearing at tap $t_2$ will exhibit a null at a frequency $\frac{1}{3}f$, $f$, (5/3)$f$, and so on (not shown).

The combined video signal appearing at intermediate tap $t_2$ is coupled to an output portion of delay line 110 including taps $t_3$, $t_4$ and $t_5$ at which delayed signals $a$, $b$ and $c$ are provided, respectively. Signal weighting elements 115a, 115b and 115c serve to modify (i.e., weight) the amplitude of the delayed signals $a$, $b$ and $c$ by respective weights of $\frac{1}{2}$, 1 and $\frac{1}{2}$, for example, prior to their combination in circuit 130. Alternatively, circuit 130 can be arranged to weight the delayed signals prior to their being combined. With these values, the signals $V_P$, $PV_P$ and $V_O$ are related to delayed signals $a$, $b$ and $c$ according to the following expressions:

$$V_P = b - \frac{1}{2}(a + c)$$

$$PV_P = P[b - \frac{1}{2}(a + c)]$$

$$V_O = b + P[b - \frac{1}{2}(a + c)]$$

Delayed signals $a$ and $c$ can be spaced apart in time by a predetermined interval $MT/2$, where M is an integer and T is the reciprocal of the frequency $f$. The preferred range of M includes integers between 2 and 5. In this example, M was chosen as 4. Other values of M may be useful in other particular applications.

Figure 4B:
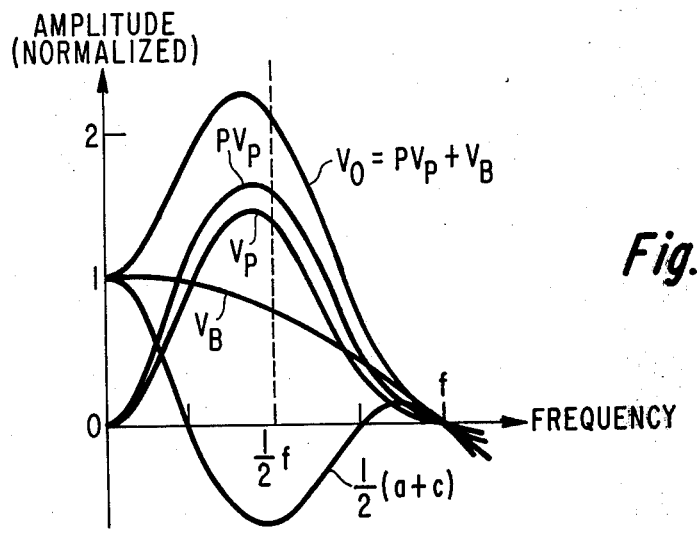

Referring now to FIG. 4b, there are shown graphical representations of the amplitude versus frequency transfer characteristic associated with delayed signals $V_B$, $\frac{1}{2}(a + c)$, $V_P$, $PV_P$ and $V_O$. The bandwidth characteristic of luminance processor 100 is primarily established by $V_B$, which exhibits a relatively flat (i.e., broad band) cosine transfer characteristic corresponding to that of the combined signal appearing at tap $t_2$ (see FIG. 4a). The transfer characteristic associated with $\frac{1}{2}(a + c)$ is a cosine function having a recurrence rate of $f$ with a minimum amplitude near odd integral multiples of $\frac{1}{2}f$. The transfer characteristics associated with both $V_P$ and $PV_P$ are relatively narrowband having amplitudes of zero at DC and integral multiples of $f$ and peak amplitudes near odd integral multiples of $\frac{1}{2}f$. The transfer characteristic associated with $V_O$ has a peak amplitude near odd integral multiples of $\frac{1}{2}f$, an amplitude equal to 1 at DC and amplitude of zero at integral multiples of $f$.

If $f$ is chosen equal to the 3.58 MHz frequency of the color subcarrier, $V_O$ is relatively accentuated in the vicinity of $\frac{1}{2}f$ so that signals in the vicinity of 1.8 MHz (i.e., relatively high frequency luminance signals) will be relatively accentuated or peaked. In this case, $V_O$ exhibits a peak amplitude at a frequency slightly less than $\frac{1}{2}f$ due to the slope of $V_B$ in the vicinity of $\frac{1}{2}f$. The slightly reduced amplitude at $\frac{1}{2}f$ can be compensated if necessary by tailoring time delays $T_3$ and $T_4$ such that $V_O$ exhibits a resultant peak amplitude at $\frac{1}{2}f$. In this event, the null frequency $f$ will be unaffected, since the null frequency is determined independently by the transfer characteristic of the combined signal appearing at tap $t_2$.

Output signal $V_O$ is relatively attenuated in the vicinity of $f$ and nulled at $f$ when $T_1$ is chosen to be equal to one-half of the reciprocal of the color subcarrier frequency, and $V_1$ and $V_2$ at taps $t_1$ and $t_2$ are of equal amplitude and polarity. The color subcarrier will be nulled and signals in the vicinity of the color subcarrier will be relatively attenuated. Since the combined input video signal appearing at tap $t_2$ exhibits an amplitude versus frequency transfer characteristic wherein the color subcarrier is trapped prior to the signal peaking operation, attenuation or nulling of the color subcarrier is independent of and unaffected by peaking adjustments. In addition, the need to provide an additional filter or trapping circuit, either before or after luminance processing circuit 100, is substantially reduced or eliminated.

The peak amplitude of $V_O$ need not occur at frequency $\frac{1}{2}f$. The peak amplitude of $V_O$ may be provided at a suitable frequency less than or greater than $\frac{1}{2}f$ by appropriately dimensioning time delays $T_3$ and $T_4$.

Figure 4C:
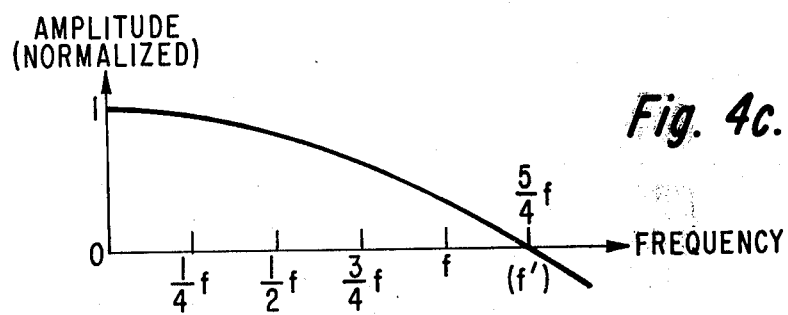

The frequency (e.g., $f$) at which a null is produced and the frequency (e.g., $\frac{1}{2}f$) at which a relatively peaked amplitude response is observed need not be specifically related as in the example explained above. That is, time delay $T_1$ can be selected such that the transfer characteristic of the combined signal appearing at tap $t_2$ produces a null at any suitable frequency in accordance with the requirements of a particular signal processing system. Thus, the combined signal at tap $t_2$ can be arranged to exhibit a null at a frequency greater than $f$ mentioned above. For example, the combined signal can exhibit a null at a frequency $f'$ equal to $5/4 \times f$ as shown in FIG. 4c. In this case, $V_B$ and $V_O$ exhibit a null at $f'$ as indicated by FIG. 4d.

Figure 4D:
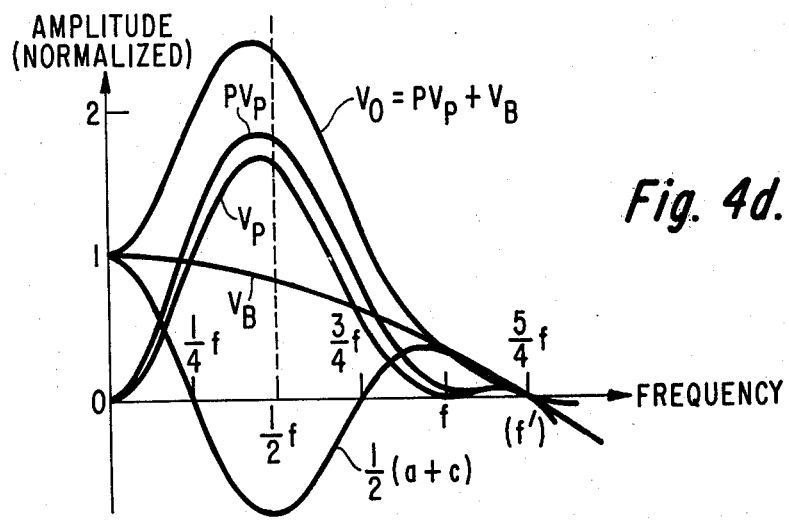

The amplitude of $V_O$ in FIG. 4d at $\frac{1}{2}f$ is slightly greater than the amplitude of $V_O$ at $\frac{1}{2}f$ in FIG. 4b. This results because the slope of $V_B$ in the vicinity of $\frac{1}{2}f$ in FIG. 4d is of lesser magnitude than the slope of $V_B$ in the vicinity of $\frac{1}{2}f$ in FIG. 4b. The higher null frequency $f'$ equal to $5/4 \times f$ in FIG. 4d therefore causes appreciably less interaction at frequency $\frac{1}{2}f$. Any interaction which would produce a shift of a frequency (e.g., $\frac{1}{2}f$) at which a peak amplitude is desired can be compensated by tailoring delay times $T_3$ and $T_4$ to produce a desired resultant peak amplitude frequency, as noted previously. In any event, adjustment of the peak amplitude of $V_O$ via peaking control 135 will not affect the null frequency insofar as the null frequency is independently determined by the transfer characteristic of the combined signal appearing at tap $t_2$.

Figure 4E:
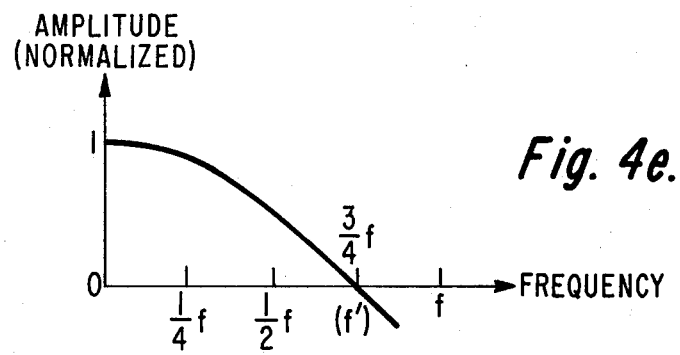
Figure 4F:
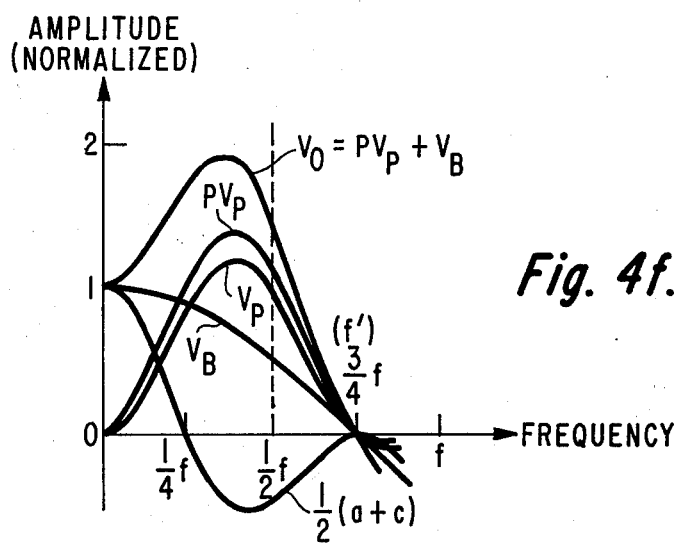

The combined signal appearing at tap $t_2$ can also be arranged to exhibit a null at a frequency less than $f$ (e.g., $f' = \frac{3}{4} \times f$) as shown by FIG. 4e. Here, $V_B$ and $V_O$ exhibit a null at $f'$ as indicated by FIG. 4f. Due to the greater slope of $V_B$ in the vicinity of frequency $\frac{1}{2}f$ in FIG. 4f, the amplitude of $V_O$ at frequency $\frac{1}{2}f$ is less than that of $V_O$ in either of the prior two examples.

It is further noted that adjustments of P to control the amplitude of the peaked portion of the transfer characteristic associated with $V_O$ do not affect the amplitude of the transfer characteristic associated with $V_O$ at DC or $f$. Thus, the brightness property associated with $V_O$ is not affected by adjustments of P. High frequency peaking of the luminance component can therefore be advantageously provided while also providing effective trapping of the chrominance component independent of peaking control.

Figure 2:
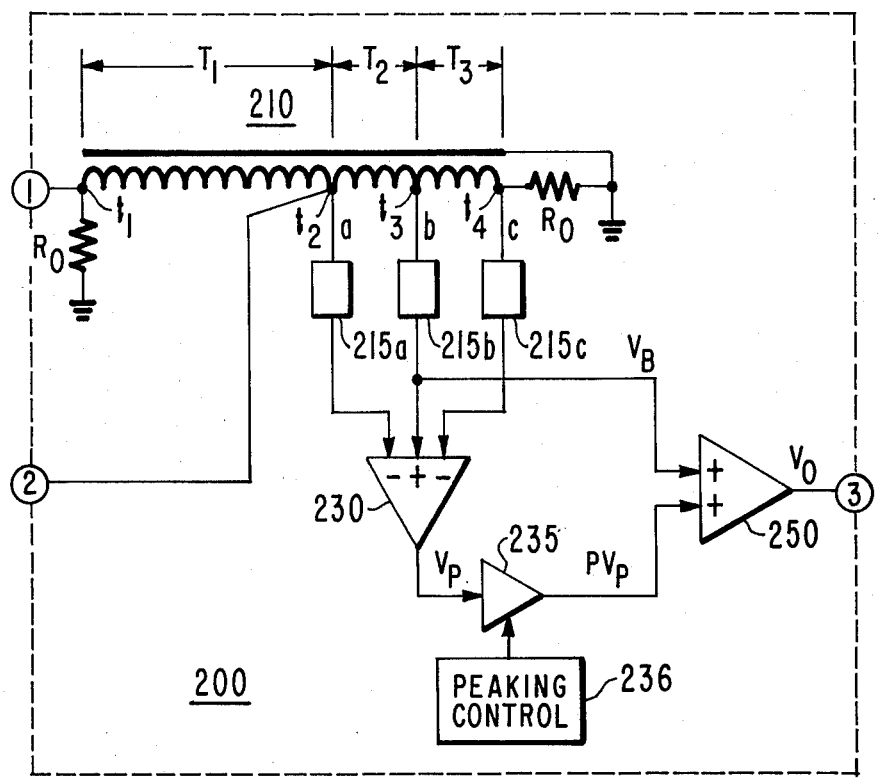
FIG. 2 shows an embodiment of the apparatus of FIG. 1.

Referring now to FIG. 2, there is shown a luminance signal processor 200 which is similar to that of FIG. 1 except that fewer taps are required.

Luminance processor 200 differs from processor 100 of FIG. 1 in that the additional input video signal, $S_2$, is coupled from terminal 2 to a pre-existing tap $t_2$ of a delay line network 210. Tap $t_2$ represents both an input tap at which a combined input video signal is developed as discussed in connection with FIG. 1, and output tap from which delayed signal "$a$" is derived. In this example, time delay $T_1$ corresponds to time delay $T_1$ of FIG. 1, and time delays $T_2$, $T_3$ respectively correspond to time delays $T_3$, $T_4$ of FIG. 1. It is noted that the arrangement of luminance processor 200 does not provide a time delay which is specifically equivalent to time delay $T_0$ in FIG. 1, for equalizing the time delays of signals processed by the chrominance and luminance channels. However, the effective time delay of delay line 210, represented by $\frac{1}{2} \times T_1$ plus $T_2$, together with the time delay of an additional delay network (not shown) either preceding or following luminance processor 200 can provide a total time delay sufficient to equalize the time delays of signals processed by the luminance and chrominance channels.

The structure and operation of luminance processor 200 are otherwise as discussed in connection with luminance processor 100 of FIG. 1. A combined input video signal appearing at tap $t_2$, wherein the chrominance component is attenuated, exhibits a frequency response characteristic as indicated by FIG. 4a, and the amplitude versus frequency response of luminance processor 200 is shown by FIG. 4b.

Figure 5:
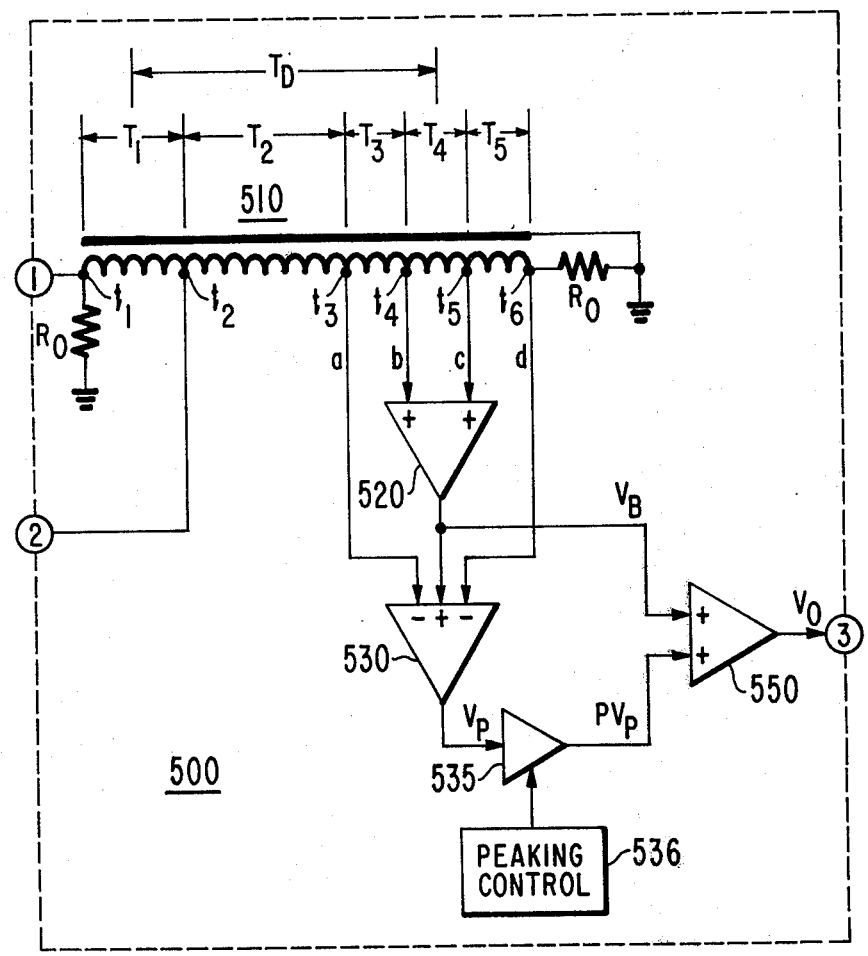
FIG. 5 is a further embodiment of the present invention.
Figure 6A:
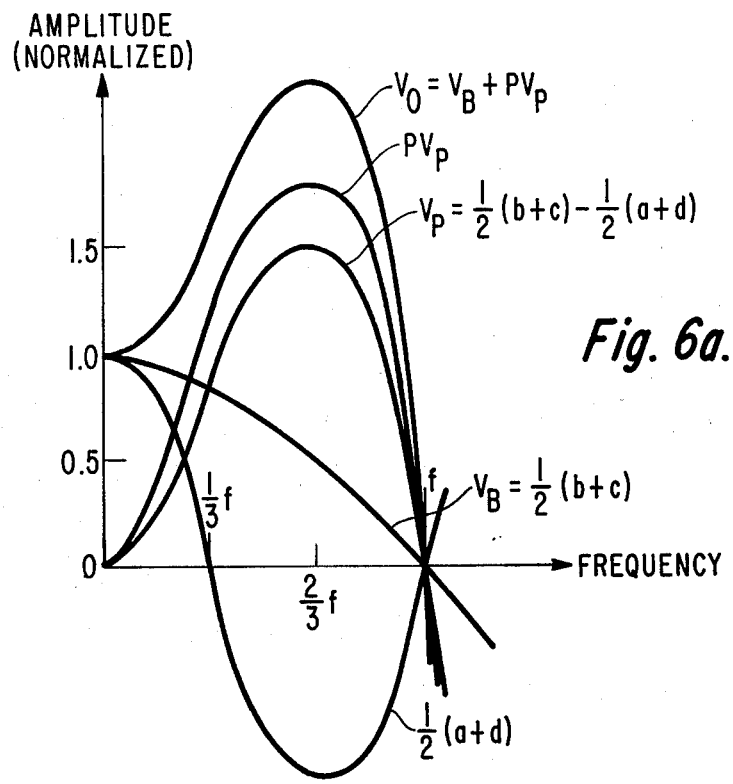
FIGS. 6a-6c are graphical representations of frequency domain waveforms useful in understanding the operation of the apparatus of FIG. 5.

In FIG. 5 there is shown a luminance processor 500 wherein taps $t_3$, $t_4$, $t_5$ and $t_6$ are coupled to a delay line 510 at spaced intervals to provide respective delayed video signals $a$, $b$, $c$ and $d$ delayed in time relative to an input video signal coupled to terminal 1 by respective time intervals $T_1+T_2$, $T_1+T_2+T_3$, $T_1+T_2+T_3+T_4$ and $T_1+T_2+T_3+T_4+T_5$. An input video signal coupled to tap $t_2$ via terminal 2 will be neglected for the moment, in which case the amplitude versus frequency response characteristics of luminance processor 500 are shown by FIG. 6a.

Delayed signals $b$ and $c$ are coupled to a summing circuit 520 where they are algebraically added to produce a relatively broadband signal $V_B$. Summing circuit 520 may be formed by any suitable circuit for algebraically summing signals such as an operational amplifier or a resistive matrix. Delayed signals $a$ and $d$ and $V_B$ are coupled to a combining circuit 530, which is similar to combining circuit 130 of FIG. 1 and serves to algebraically subtract $a$ and $d$ from $V_B$ to produce a relatively narrowband signal $V_P$. The peaking characteristics of luminance processor 500 are primarily determined by $V_P$.

The output signal of combining circuit 530, $V_p$, is coupled to a variable gain device 535 responsive to a control signal from a peaking control 536. Device 535 serves to modify the amplitude of $V_p$ to produce a signal $PV_p$, where P is the gain (or attenuation) factor of variable gain device 535, as mentioned in connection with FIG. 1.

The output of variable gain device 535, $PV_p$, is coupled to summing circuit 550. Summing circuit 550 is similar to summing circuit 520 and serves to algebraically add signals $PV_p$ and $V_B$ to produce an output signal $V_O$ of processor 500.

In this example, taps $t_3$, $t_4$, $t_5$ and $t_6$ are disposed symmetrically around a point of delay lime 510 midway between taps $t_4$ and $t_5$, and time intervals $T_3$, $T_4$ and $T_5$ are each equal to $\frac{1}{2} \times 1/f$, where $f$ is the frequency of a signal component of input video signal $S_1$ which may be undesirably present in luminance channel 65 of FIG. 1. For instance, $f$ may be the frequency of a signal in the range of frequencies containing the chrominance or sound subcarriers or both. More specifically, $f$ may be the color subcarrier frequency, e.g., 3.58 MHz, or the sound intercarrier frequency, e.g., 4.5 MHz. Further, by way of example, it is assumed that summing circuit 520 is arranged to modify the amplitudes of delayed signals $b$ and $c$ by a weight of $\frac{1}{2}$. Combining circuit 530 is arranged to modify the amplitudes of delayed signals $a$ and $d$ by weights of $\frac{1}{2}$ and relatively broadband signal $V_B$ by a weight of 1.

Delayed signals $a$ and $d$ can be spaced apart in time by a predetermined interval M'T/2 where M' is an integer and T is the reciprocal of the frequency $f$. The preferred range of M' includes integers between 2 and 5. In this example, M' was chosen as 3. Other values of M' may be useful in other particular applications.

With the values according to the example set forth above, the signals $V_B$, $V_P$, $PV_P$ and $V_O$ are related to delayed signals $a$, $b$, $c$ and $d$ according to the following expressions:

$$V_B = \frac{1}{2}(b + c)$$

$$V_p = V_B - \frac{1}{2}(a + d) = \frac{1}{2}(b + c) - \frac{1}{2}(a + d)$$

$$PV_p = p[\frac{1}{2}(b + c) - \frac{1}{2}(a + d)]$$

$$V_O = V_B + PV_p = \frac{1}{2}(b + c) + p[\frac{1}{2}(b + c) - \frac{1}{2}(a + d)].$$

Referring to FIG. 6a, there are shown graphical representations of the amplitude versus frequency transfer characteristics associated with the signals $\frac{1}{2}(a + d)$, $V_B$, $PV_p$ and $V_O$ associated with luminance processor 500, without a video signal coupled to tap $t_2$. The transfer characteristic of $V_B$ is a cosine function having a periodic rate of $4 \times 1/f$ while the transfer characteristic associated with $\frac{1}{2}(a + d)$ is a cosine function having a periodic rate of $(4/3) \times (1/f)$. In the frequency range extending from DC (i.e., zero frequency) to $f$, $V_B$ is relatively broadband, the extent of its bandwidth being determined by the time delay between delayed signals $b$ and $c$. The transfer characteristic associated with $V_P$ is relatively narrowband having an amplitude equal to zero at DC and $f$ and having a peak amplitude at $\frac{2}{3}f$. The location of the peak amplitude of the transfer characteristic associated with $V_P$ is determined by the time delay between delayed signals $a$ and $d$. The transfer characteristic associated with $V_O$ is relatively accentuated or peaked at $\frac{2}{3}f$ and relatively attenuated or nulled at $f$.

Since the amplitude of the transfer characteristic associated with $V_P$ is zero at DC and $f$, adjustments of P, while controlling the amplitude of the transfer characteristic in the vicinity of $\frac{2}{3}f$, do not affect the amplitude of the transfer characteristic at DC or at $f$. This is desirable since the amplitude of $V_O$, formed by the addition of $V_B$ and $PV_P$ may be adjusted in the vicinity of $\frac{2}{3}f$ without affecting the normalized amplitude (1) of the transfer characteristic at DC or the normalized amplitude (zero) at $f$. This feature is significant since the amplitude of the transfer characteristic at DC, i.e., the DC component of $V_O$, is related to the brightness property of an image reproduced from $V_O$ and the amplitude of the transfer characteristic at $f$ is related to the attenuation of undesired components of $V_O$.

The frequency $f$ is determined by the delay $T_4$ between delayed signals $b$ and $c$ according to the expression:

$$f = \frac{1}{2} \times 1/T_4.$$

The peak amplitude of $V_O$ occurs at a frequency which is related to the frequency at which the peak amplitude of $V_P$ occurs. The latter frequency corresponds to the reciprocal of the time delay $T_3 + T_4 + T_5$ between delayed signals $a$ and $d$.

Selection of time intervals $T_3$, $T_4$ and $T_5$ equal to 140 nanoseconds (i.e., one-half the reciprocal of the color subcarrier frequency, 3.58 MHz) is advantageous since the amplitude versus frequency transfer characteristic associated with $V_O$ will then have a peak amplitude at a relatively high frequency near 3.58 MHz, approximately $\frac{2}{3} \times 3.58$ MHz (i.e., 2.4 MHz), while providing effective 3.58 MHz trapping in this case. However, other selections of $T_3$, $T_4$ and $T_5$ may also be utilized. For example, it may be desirable to select $T_4$ equal to 110 nanoseconds and $T_3$ and $T_5$ equal to 140 nanoseconds. In this case, the amplitude versus frequency transfer characteristic associated with $V_O$ will have a value of substantially zero at approximately 4.1 MHz, while having a peak amplitude at approximately 2.4 MHz.

Figure 6B:
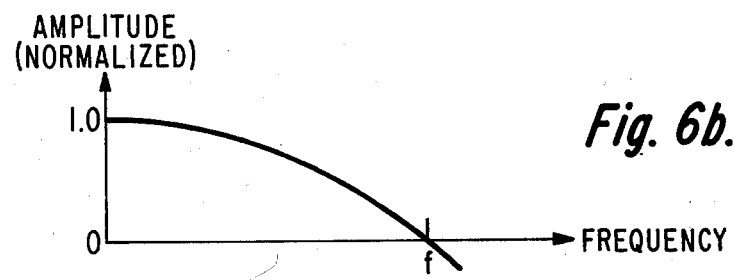

It may be desirable to provide a means for peaking the amplitude of signal $V_O$ at various frequencies while at the same time preserving effective 3.58 MHz trapping. That is, it may be desirable to maintain an invariant signal null point ($f$) at which the color subcarrier is effectively trapped or nulled independent of signal amplitude peaking adjustments at various frequencies. This can be accomplished by also coupling the video signal ($S_2$ in FIG. 1) to input tap $t_2$ of delay line 510 via terminal 2. In this case, and when $T_1$ is chosen equal to one-half the period of the color subcarrier component, for example, a combined video signal then appearing at tap $t_2$ exhibits an amplitude versus frequency response characteristic as shown by FIG. 6b, wherein the color subcarrier component of frequency $f$ is nulled. The manner in which the combined video signal is developed at tap $t_2$ has been discussed in connection with FIG. 1.

Figure 6C:
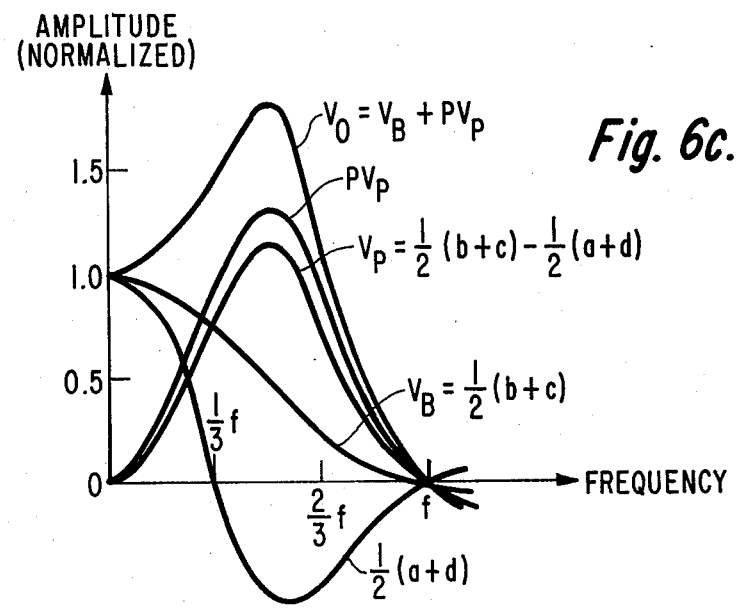

The frequency response of luminance processor 500 is shown by the waveforms of FIG. 6c. Signal $V_O$ of FIG. 6c exhibits a peak amplitude in the vicinity of $\frac{1}{2} \times$ 3.58 MHz, when time delays $T_3$, $T_4$ and $T_5$ each equal 140 nanoseconds. In this connection it is noted that waveform $V_B$ of FIG. 6c represents the product of the waveform associated with the combined video signal appearing at tap $t_2$ (see FIG. 6b), and the waveform otherwise developed by summing delayed signals *b* and *c*.

The peak amplitude of output waveform $V_O$ can be varied in response to peaking control 536 to produce a desired peak amplitude characteristic at a given frequency, and the frequency at which peaking occurs can be tailored by appropriately selecting time delays $T_3$, $T_4$ and $T_5$. In any event, the null frequency, $f$, will remain invariant and independent of such adjustments when a combined input video signal is produced at input tap $t_2$, as discussed. As mentioned in connection with FIG. 1, the combined signal appearing at tap $t_2$ can be arranged to exhibit a null at a frequency greater or less than $f$, thereby causing $V_O$ to exhibit a null at such frequency.

Figure 7:
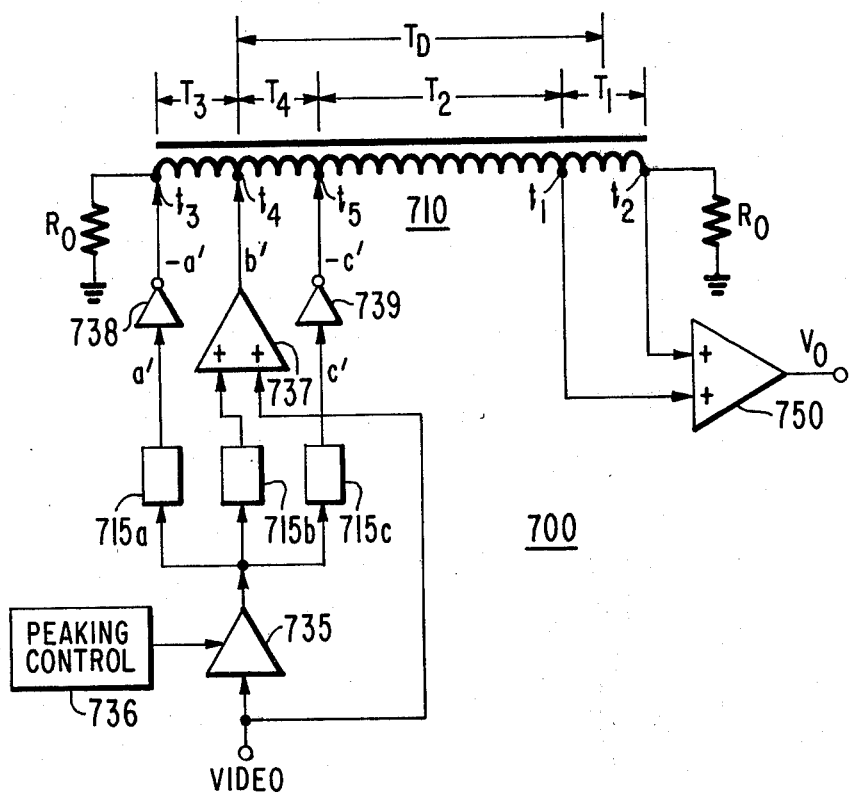
FIG. 7 shows still another embodiment of the present invention.

FIG. 7 shows a luminance signal processing arrangement 700 including a delay line 710 wherein the relative positions of the peaking and trapping portions of the delay line are interchanged. In FIG. 7, delay times $T_D$ and $T_1$, $T_2$, $T_3$ and $T_4$ correspond to counterpart delay times of FIG. 1.

A composite video signal is coupled to a variable gain device 735 which is responsive to a control signal from a peaking control 736 for adjusting the amplitude of the video signal. An output signal from device 735 is coupled to signal amplitude weighting elements 715a–715c. Output signals $a'$ and $c'$ from elements 715a and 715c are coupled signal inverters 738 and 739 to produce inverted signals $-a'$ and $-c'$, which are coupled to input taps $t_3$ and $t_5$ of delay line 710. A summing circuit 737 algebraically adds the input video signal and the weighted, amplitude adjusted signal from element 715b to provide a signal $b'$, which is then coupled to input tap $t_4$ of delay line 710.

Figure 8:
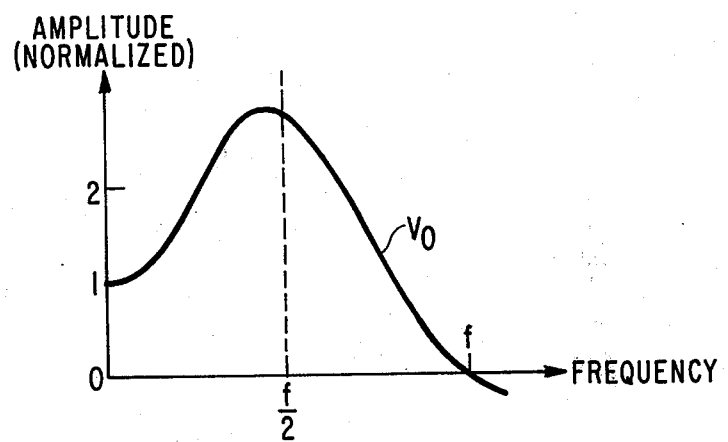
FIG. 8 represents a frequency domain output waveform of the apparatus of FIG. 7.

A delayed video signal appears at output tap $t_1$, and a further delayed video signal appears at output tap $t_2$. Where a color subcarrier component of the video signal is to be trapped, the further time delay $T_1$ corresponds to one-half the reciprocal of the color subcarrier frequency. The delayed signals appearing at output tabs $t_1$ and $t_2$ are algebraically summed by a summing circuit 750. An output signal of circuit 750 exhibits a frequency response characteristic as shown by FIG. 8, wherein the color subcarrier component of frequency $f$ is nulled. As with the previously described embodiments of the invention, the null frequency, $f$, is fixed and does not vary with peaking adjustments provided by peaking control 736 or adjustment of time delays $T_3$ and $T_4$.

Although the present invention has been described with reference to particular embodiments, various additional modifications may be made within the scope of the invention. For example, although delay networks have been shown as comprising an inductance or coil type delay line, the delay networks may be formed by CCD devices or by any other suitable device for delaying a signal such as charge transfer devices or active resistance-capacitance delay devices. Also, signals may be coupled to the delay network by any suitable means such as capacitive coupling or the like. Furthermore, and with reference to the embodiments of FIG. 1, for example, the polarity of the signals coupled to input taps $t_1$ and $t_2$ may be inverted with respect to each other. In this case the combined signal appearing at tap $t_2$ will exhibit an amplitude response such that a minimum amplitude response will occur at DC and a maximum or peak amplitude response will occur at a frequency of interest (e.g., frequency $f$) and multiples thereof.

What is claimed is:

1. Apparatus for processing a composite electrical signal, comprising:
    a source of composite electrical signal;
    wide bandwidth signal delaying means having at least respective end terminals and an intermediate terminal;
    first means for coupling said composite signal to one of said end terminals of said signal delaying means;
    second means for coupling said composite signal to said intermediate terminal of said signal delaying means, said one end terminal and said intermediate terminal being arranged to provide a signal time delay therebetween substantially equal to NT/2, where N is an odd integer and T is the reciprocal of a selected frequency at which it is desired to provide a predetermined amplitude response of said composite signal, so that a combined signal appearing at said intermediate terminal is representative of relatively delayed and undelayed composite signals and exhibits said predetermined amplitude response at said selected frequency; and
    utilization means coupled to a remaining one of said end terminals for translating said combined signal.

2. Apparatus according to claim 1, wherein said utilization means includes:
    means for controlling the peak amplitude response of said combined signal as a function of a control signal; and
    said predetermined amplitude response of said combined signal is provided substantially independent of said controllable peak amplitude response provided by said control means.

3. Apparatus according to claim 1, wherein said signal delaying means includes an additional terminal between said intermediate terminal and said remaining end terminal, and wherein said utilization means comprises:
    means, coupled to said additional terminal and responsive to said combined signal, for deriving a broadband signal including signal components in a frequency range encompassing a frequency $f$;
    means, coupled to a plurality of terminals of said signal delaying means and responsive to said combined signal, for deriving a relatively narrowband signal, said plurality of terminals including said additional terminal and said remaining end terminal, said narrowband signal deriving means having a peak amplitude response in a frequency band below the frequency $f$ and a relatively lower amplitude response at said frequency $f$; and
    output means for combining said narrowband signal and said broadband signal to produce an output signal having relatively accentuated high frequency components in said frequency band, and wherein said output signal exhibits a relatively lower amplitude response at said frequency $f$.

4. Apparatus according to claim 3, wherein said narrowband signal deriving means includes:
    means for controlling said peak amplitude response as a function of a control signal.

5. Apparatus according to claim 4, wherein:

said selected frequency corresponds to said frequency $f$;

said time delay between said one end terminal and said intermediate terminal is substantially equal to one-half said reciprocal of said frequency $f$; and said composite signal is coupled to said one end terminal and to said intermediate terminal with the same polarity.

6. Apparatus according to claim 5, wherein:

said relatively delayed and undelayed signals appearing at said intermediate terminal to form said combined signal are of substantially equal amplitude, whereby said output signal exhibits a substantially zero amplitude response at said frequency $f$, independent of adjustment of said peak amplitude response via said control means.

7. Apparatus according to claim 4, wherein:

said selected frequency corresponds to a frequency $f'$ different from said frequency $f$;

said time delay between said one end terminal and said intermediate terminal is substantially equal to one-half said reciprocal of said frequency $f'$; and said composite signal is coupled to said one end terminal and to said intermediate terminal with the same polarity.

8. Apparatus according to claim 7, wherein:

said relatively delayed and undelayed signals appearing at said intermediate terminal to form said combined signal are of substantially equal amplitude, whereby said output signal exhibits a substantially zero amplitude response at said frequency $f'$, independent of adjustment of said peak amplitude response via said control means.

9. Apparatus according to claim 3, wherein:

said narrowband signal deriving means includes means coupled to said remaining end terminal and to another of said plurality of terminals for providing a sum signal comprising the sum of at least two delayed signals delayed from one another by a time interval substantially equal to $MT/2$, where T is the reciprocal of said frequency $f$ and M is an integer;

said broadband signal deriving means is responsive to a delayed signal provided at said additional terminal, said broadband signal having an average delay between the delays of the signals comprising said sum signal; and said narrowband signal deriving means also includes means for combining said broadband signal with said sum signal.

10. Apparatus according to claim 9, wherein:

said narrowband signal deriving means provides the difference between said broadband signal and said sum signal.

11. Apparatus according to claim 10, wherein:

said output combining means provides the sum of the outputs of said narrowband signal deriving means and said broadband signal deriving means.

12. Apparatus according to claim 11, wherein:

said broadband signal has an average delay substantially equal to the average of the delays of the signals comprising said sum signal.

13. Apparatus according to claim 12, wherein:

said plurality of terminals provide at least a first delayed signal at said other terminal, a second delayed signal at said additional terminal, and a third delayed signal at said remaining end terminal;

said broadband signal deriving means derives said broadband signal from said second delayed signal; and said intermediate terminal of said signal delaying means corresponds to said other terminal at which said first delayed signal is provided.

14. Apparatus according to claim 12, wherein:

said plurality of terminals include said additional terminal, said remaining end terminal, said other terminal and a fourth terminal, and provide a first delayed signal at said other terminal, a second delayed signal at said additional terminal, a third delayed signal at said remaining end terminal, and a fourth delayed signal at said fourth terminal;

said first and third delayed signals being coupled to said sum signal providing means; and said second and fourth delayed signals being combined in said broadband signal deriving means to derive said broadband signal.

15. In color television receiver apparatus for processing composite color video signals inclusive of a luminance component and a chrominance component comprising a modulated color subcarrier; said apparatus including a chrominance channel for processing said chrominance component; a luminance channel for processing said luminance component, said luminance channel comprising:

signal delaying means including at least respective end terminals and an intermediate terminal, one of said end terminals and said intermediate terminal being coupled to receive said composite video signals, with the signal delay therebetween substantially equal to $NT/2$, where N is an odd integer and T is the reciprocal of a selected frequency at which it is desired to attenuate said composite video signals, so that a combined signal appearing at said intermediate terminal is attenuated at said selected frequency; and utilization means coupled to a remaining one of said end terminals for translating said combined signal.

16. Apparatus according to claim 15, wherein said utilization means comprises transversal equalizer means coupled to a plurality of terminals of said signal delaying means, including:

means for deriving a broadband signal including signal components in a frequency range between zero hertz and $f$;

means for deriving a relatively narrowband signal, said narrowband means having an accentuated amplitude response at a frequency between zero hertz and $f$ and a relatively lower amplitude response at frequencies of zero hertz approximately $f$;

output means for combining said narrowband signal and said broadband signal to produce an output signal having relatively accentuated high frequency portions between zero hertz and said frequency $f$, and wherein said output signal exhibits a relatively lower amplitude response at said frequency $f$; and means coupled to said narrowband signal deriving means for controlling said accentuated amplitude response between zero hertz and said frequency $f$ as a function of a control signal; and wherein video signals received at said one end terminal and said intermediate terminal are of the same polarity, and of such relative amplitudes that the relatively delayed and undelayed signals forming said combined signal at said intermediate terminal are of substantially the same amplitude, whereby said output signal exhibits a substantially zero amplitude response at said selected frequency with substantial independence of the control of said accentuated amplitude response as provided by said control means.

17. Apparatus according to claim 16, wherein: said selected frequency corresponds to the frequency of said color subcarrier.

18. Apparatus according to claim 16, wherein: the delay provided by said signal delaying means at said plurality of terminals is such as to equalize the delay of said output signal with a time delay imparted to said chrominance component by said chrominance channel.

* * * * *

UNITED STATES PATENT OFFICE
CERTIFICATE OF CORRECTION

PATENT NO. : 4,074,308

DATED : February 14, 1978

INVENTOR(S) : Walter Gold Gibson

It is certified that error appears in the above-identified patent and that said Letters Patent are hereby corrected as shown below:

Col. 5, line 53, "$V_2 = (IR_0/2 \cos(\omega t + \theta)$" should read -- $V_2 = IR_0 2 \cos(\omega t + \theta)$ --;

line 60, "$V_1 = (IR_0/2 \cos(\omega t + \theta - \omega T_1)$" should read -- $V_1 = IR_0/2 \cos(\omega t + \theta - \omega T_1)$ --.

Col. 6, line 35, "(5/3f," should read -- 5/3f, --.

Col. 7, line 55, "frequency f" should read -- frequency f' --;

line 57, "at f" should read -- at f' --;

line 63, "f equal" should read -- f' equal --.

Col. 8, line 8, "f = 3/4 x f)" should read -- f' = 3/4 x f) --;

line 9, "null at f as" should read -- null at f' as --;

line 15, "with V o do" should read -- with $V_0$ do --.

Col. 9, line 65, "(4/3) x (1/f)." should read -- 4/3 x 1/f. --.

Signed and Sealed this

First Day of May 1979

[SEAL]

Attest:

RUTH C. MASON
*Attesting Officer*

DONALD W. BANNER
*Commissioner of Patents and Trademarks*